United States Patent
Hempel et al.

(10) Patent No.: US 10,266,451 B2
(45) Date of Patent: Apr. 23, 2019

(54) METHOD FOR PRODUCING A CALCIUM HYDROXIDE-BASED CONSTRUCTION MATERIAL AND RESULTING CONSTRUCTION MATERIAL

(71) Applicant: HEMPEL FAMILIENSTIFTUNG, Vaduz (LI)

(72) Inventors: Jorgen Hempel, Onnens (CH); Jordan Wolf, Kalmthout (BE)

(73) Assignee: HEMPEL FAMILIENSTIFTUNG, Vaduz (LI)

( * ) Notice: Subject to any disclaimer, the term of this patent is extended or adjusted under 35 U.S.C. 154(b) by 136 days.

(21) Appl. No.: 15/316,369

(22) PCT Filed: Jun. 3, 2015

(86) PCT No.: PCT/CH2015/000085
§ 371 (c)(1),
(2) Date: Mar. 8, 2017

(87) PCT Pub. No.: WO2015/184559
PCT Pub. Date: Dec. 10, 2015

(65) Prior Publication Data
US 2017/0183264 A1    Jun. 29, 2017

(30) Foreign Application Priority Data
Jun. 4, 2014  (CH) ........................ 857/14

(51) Int. Cl.
| | | |
|---|---|---|
| *C04B 16/02* | (2006.01) | |
| *C04B 14/06* | (2006.01) | |
| *C04B 14/14* | (2006.01) | |
| *C04B 28/18* | (2006.01) | |
| *C04B 40/00* | (2006.01) | |
| *C04B 18/24* | (2006.01) | |
| *C04B 111/28* | (2006.01) | |
| *C04B 111/52* | (2006.01) | |

(52) U.S. Cl.
CPC ............. *C04B 28/18* (2013.01); *C04B 16/02* (2013.01); *C04B 18/24* (2013.01); *C04B 18/248* (2013.01); *C04B 40/0039* (2013.01); *C04B 2111/28* (2013.01); *C04B 2111/52* (2013.01); *C04B 2201/30* (2013.01); *Y02W 30/97* (2015.05)

(58) Field of Classification Search
CPC ..... C04B 28/18; C04B 40/0039; C04B 16/02; C04B 18/24; C04B 18/248; C04B 2111/28; C04B 2111/52; C04B 2201/30
See application file for complete search history.

(56) References Cited

U.S. PATENT DOCUMENTS 4,799,961  A    1/1989   Friberg

FOREIGN PATENT DOCUMENTS

| DE | 16753 | | 4/1881 |
| DE | 196 43 605 A1 | | 4/1998 |
| EP | 2 263 985 A1 | | 12/2010 |
| EP | 2404885 A2 | * | 1/2012 |
| FR | 971 739 | | 1/1951 |
| FR | 2 923 242 A1 | | 5/2009 |
| JP | 52-49233 A | * | 4/1977 |
| WO | WO 2013/076503 A1 | * | 5/2013 |

* cited by examiner

*Primary Examiner* — Anthony J Green
(74) *Attorney, Agent, or Firm* — Davis & Bujold PLLC; Michael J. Bujold

(57) ABSTRACT

A budding material based on calcium hydroxide, in which the main component is lime of the type known as "hydrated lime", which is mixed a filler of organic and/or mineral origin to produce a structural mass comprising of the basic component and the filler. A defined volume of water, calculated as a function of the volume of the structural mass, is added thereto to produce a paste that can be worked and is capable of hardening. To ensure setting of the material, an additive comprising at least one powder based on natural materials of volcanic origin is added to the pasty structural mass. The additive is preferably pozzolana and the filler advantageously comprises shavings or fibers of substances, preferably of vegetable origin such as hemp or wood.

16 Claims, No Drawings

METHOD FOR PRODUCING A CALCIUM HYDROXIDE-BASED CONSTRUCTION MATERIAL AND RESULTING CONSTRUCTION MATERIAL

This application is a National Stage completion of PCT/CH2015/000085 filed Jun. 3, 2015, which claims priority from French patent application serial no. 857/14 filed Jun. 4, 2014.

FIELD OF THE INVENTION

The present invention concerns a process for the preparation of a calcium hydroxide-based building material, in which the main component is calcium hydroxide, referred to as "hydrated lime", which is mixed with an organic and/or inorganic filler to produce a structural mass to which a defined volume of water is added, the said volume being calculated as a function of the volume of the said structural mass, to produce a paste which is workable and capable of hardening.

The invention also concerns a calcium hydroxide-based building material, in which the main component is calcium hydroxide, referred to as "hydrated lime", mixed with an organic and/or inorganic filler to produce a structural mass to which a defined volume of water is added, the said volume being calculated as a function of the mass of the said structural mass, to produce a paste which is workable and capable of hardening.

BACKGROUND OF THE INVENTION

The construction of structures based on calcium hydroxide has gained popularity since builders became aware that the said material has exceptional properties in terms of noise insulation and heat insulation, and also concerning hydraulic exchanges. Mixtures of calcium hydroxide with particles or fibers have been developed, in particular but not exclusively wood shavings and hemp, to produce screeds, partitions, insulating claddings for doubling existing walls, or partition fillers for wood-framed houses. The results are indisputable, so that the material certainly has an assured future when one considers the trend toward ecological designs that seek simple and natural methods for producing products that can be recycled and that favor energy economy.

Until now a material referred to as hydraulic lime has been commonly used, which contains essentially between 10 and 20% of clay and which is calcium carbonate that has been heated in a furnace to temperatures of the order of 1200° C. and in any case lower than 1500° C. However, some of the natural lime, transformed to slaked lime referred to as hydrated lime, has nevertheless already been transformed to cement, referred to as Portland cement, during the process. The result is that the material obtained, which sets relatively rapidly, becomes particularly inert and to some extent loses the properties sought, namely:

its ability to become a hydraulic absorbent, which takes up moisture and then releases it and so plays the part of a thermal regulator; and its ability to absorb relatively large amounts of carbon dioxide, so giving rise to natural carbonation and hardening that increases with time.

Furthermore, it should be noted that hydraulic lime is a manufactured product which is at present only found in industrialized countries and which is most certainly more expensive than the almost natural hydrated lime found cheaply all over the world. The problem associated with hydrated lime is that of its setting and hardening. In fact it sets very slowly, which is a drawback for the use of the material despite its advantages in other respects. For that reason it is almost impossible to use in practice.

German Patent No. 16753 of 1881 describes a process for producing a mass intended for the construction of parts of a building, in particular a flame-proof cladding and a floor. The mixture of materials described by the said patent, and in particular its two Claims 1 and 2, comprises among other things especially slaked lime and cement to which have been added relatively disparate mineral compounds such as gypsum, chalk, and sand, and organic substances such as blood. The presence of cement has the advantage that is accelerates the hardening of the mass, but its major disadvantage is that it prevents the natural carbonization of the lime which advantageously takes place by natural and progressive absorption of carbon dioxide. Because of that, the process described does not in any way respond to the problem solved by the present invention.

SUMMARY OF THE INVENTION

The present invention proposes to compensate for the disadvantages mentioned above by providing a process which makes it possible to solve the problem of the hardening time of the building material obtained, by accelerating the setting of the hydrated lime. The process renders this material advantageous for its hydraulic and thermal qualities, which are compatible with industrial use and which enable it to preserve its capacity to absorb carbon dioxide with a view to natural carbonization.

That objective is achieved by the process according to the invention as defined by the preamble, characterized in that to the said structural mass is added an additive in the form of a mixture of mineral substances whose composition comprises at least one powder based on natural materials of volcanic origin.

Preferably, the said powder based on natural materials of volcanic origin contains at least pozzolana.

Advantageously, the said powder based on natural materials of volcanic origin is finely crushed and consists of particles between 10 μm and 500 μm, and preferably between 10 μm and 50 μm.

According to a preferred embodiment the said filler mixed with the said main component contains particles and/or fibers of vegetable origin.

The proportion of filler in the form of hemp shavings is advantageously between 20% and 200%, and preferably between 50% and 80% of the weight of the main component.

The proportion of the said powder based on natural materials of volcanic origin is advantageously between 5% and 25%, and preferably between 10% and 20% of the weight of the main component.

The main component, the filler and the additive are advantageously initially dry-mixed, before the water is added.

In a particularly advantageous embodiment, the main component and the filler are mixed first, the water is then added, and finally the additive is added.

The calcium hydroxide-based budding material according to the invention is characterized in that it contains an additive consisting of at least one powder based on natural materials of volcanic origin.

Preferably, the said powder based on natural materials of volcanic origin contains at least pozzolana.

The said powder based on natural materials of volcanic origin is preferably finely crushed and consists of particles between 10 μm and 500 μm, and preferably between 10 μm and 50 μm.

The said filler mixed with the said main component advantageously contains particles and/or fibers of vegetable origin, in particular particles or fibers of vegetable origin chosen from among the group consisting of wood, hemp, kenaf, coconut and reeds.

According to a preferred embodiment, which makes it possible to produce a building material which is effective in terms of its thermal and hydraulic properties and is economical and easy to use, the said filler mixed with the said main component contains hemp shavings.

The proportion of filler in the form of hemp shavings is advantageously between 20% and 200%, and preferably between 50% and 80% of the weight of the main component.

The proportion of the said powder based on natural materials of volcanic origin is advantageously between 5% and 25%, and preferably between 10% and 20% of the weight of the main component.

DETAILED DESCRIPTION OF THE PREFERRED EMBODIMENTS

The present invention and its advantages will be better understood after reading the following detailed description of a method of carrying out the process, and of preferred embodiments of the building material.

Producing a building element by means of hard materials is often done using concrete. Concrete is an inert material which has very poor thermal insulation properties and which is incapable of absorbing and then releasing ambient humidity. As regards thermal insulation, a wall or any other building element intended for use in dwellings made of concrete must be associated with at least one insulation layer applied to the building element. This double production process is clearly expensive, mainly because of the labor involved, and its effectiveness is quite inadequate, particularly as regards its hydraulic characteristics for absorbing and releasing humidity and for constituting an absorber of moisture and heat with a view to regulating the temperature of a building.

It has been attempted to produce these characteristics by replacing the concrete with a composition based on calcium hydroxide, in particular mixed with a mineral filler such as sand, or an organic filler such as fibers or shavings of vegetable origin such as hemp, kenaf—known as Deccan hemp—or even grass. The calcium hydroxide currently used in this context is hydraulic lime obtained from calcium carbonate $Ca_2O_3$, by calcining in a furnace at a high temperature between 1200° C. and 1500° C. The result of this treatment is to transform most of the calcium carbonate into hydraulic lime, but it also produces a certain amount of cement, called Portland cement, which is obtained by calcining calcium carbonate in a furnace at a temperature of the order of 1800° C. It is therefore a mixture of hydraulic lime and Portland cement which is usually used, which entails some degradation of the hydraulic properties of the lime due to the presence of the inert material in the form of Portland cement.

Owing to the presence of cement the setting of the mixture based on hydraulic lime is relatively rapid, so the material obtained can be used in essence like concrete to produce a screed or a façade cladding or the like. For example, a mixture made from hydraulic lime and organic shavings or fibers such as hemp is used as a fairly common building material and comprises between 40 and 70 Kg and preferably between 50 and 60 Kg of hydraulic lime for a quantity of organic constituents between 15 Kg and 25 Kg and preferably about 20 Kg. The specific mass of this mixture is relatively high and its thermal insulation capacity is relatively poor. For practical reasons the fact that hydraulic lime is used does not enable the density to be reduced and the insulating properties to be improved. Furthermore, the use of hydraulic lime increases the cost of the building material. Finally, hydraulic lime, which is an inert material, does not have the absorption capacity that hydrated lime possesses, namely the ability to absorb large amounts of carbon dioxide and thereby enabling the material to undergo natural carbonization by storing the excess $CO_2$ in the atmosphere.

When hydrated lime is used the composition of the mixture is as follows: the main component is hydrated lime, the filler is in the form of mineral or organic particles in the form of shavings, in particular hemp shavings, and the additive is in the form of powders based on natural materials of volcanic origin, in particular pozzolana. The proportion of filler in the form of hemp shavings is between 20% and 200%, preferably between 50% and 80% of the weight of the main component, namely the hydrated lime. The said powder based on natural materials of volcanic origin is finely crushed and consists of particles between 10 μm and 500 μm and preferably between 10 μm and 50 μm. The proportion of the said powder based on natural materials of volcanic origin is between 5% and 25%, and preferably between 10% and 20% of the weight of the main component.

As an example, the composition of the building material according to the invention can be as follows; to 25 Kg of hydrated lime are added about 20 Kg of hemp and 3 Kg to 5 Kg of additives, for example pozzolana. The building material obtained has a lower density such that its specific weight is around 230 $Kg/m^3$. Its heat insulating properties are improved, as also is its wettability and capacity for absorbing humidity. The additive considerably increases the bonding of the particles of hydrated lime and facilitates mixing during the preparation of the "paste" when the water is added. The mixture is more homogeneous and it is found that the formation of "lumps" that characterizes traditional preparations with hydrated lime does not take place in this case. The density of the material obtained is lower than when hydraulic lime is used. Hardening takes place partially, but sufficiently thanks to the volcanic additive. Complete hardening takes place in the course of time, in the form of natural carbonization by absorption of the carbon dioxide ($CO_2$) present in the atmosphere.

The purpose of the present invention is to enable the use of hydrated lime or slaked lime as the basis for a building material with a sufficiently rapid setting time to enable industrial application. That rapidity is achieved thanks to the additive. Furthermore, hydrated lime is a cheap material found almost all over the world, even in non-industrialized countries which are not equipped for the production of cement. The buildings constructed are durable over time, because the carbonization of the hydrated lime takes place naturally thanks to natural exchanges and to the ambient humidity. The volcanic powder is a cheap material available at any volcanic location, whether extinct or active. The buildings are ecological, since they can be recycled, the gray energy is minimal and they are economical since the components can be found close to the building sites.

The invention is not limited to the use of hemp and pozzolana, but can be extended to similar materials that have the same characteristics.

The invention claimed is:

1. A process for preparation of a building material based on calcium hydroxide, in which a first component is lime, the process comprising:
    mixing a filler of organic origin with the first component to produce a structural mass;
    including at least one of particles and fibers of vegetable origin in the filler mixed with the first component;
    including a proportion of the filler, in the form of hemp shavings, of between 20% and 200% of a weight of the first component;
    adding to the structural mass a defined volume of water calculated as a function of a volume of the structural mass to produce a paste that can be worked and is capable of hardening; and
    adding an additive, comprising at least one powder based on natural materials of volcanic origin, to the structural mass.

2. The process according to claim 1, further comprising including at least pozzolana in the powder based on natural materials of volcanic origin.

3. The process according to claim 1, further comprising finely crushing the powder based on natural materials of volcanic origin into particles between 10 µm and 500 µm.

4. The process according to claim 1, further comprising including a proportion of the powder based on natural materials of volcanic origin of between 5% and 25% of a weight of the first component.

5. The process according to claim 1, further comprising initially dry-mixing the first component, the filler and the additive before the water is added.

6. The process according to claim 1, further comprising dry-mixing the first component and the filler,
    then adding the water, and subsequently adding the additive.

7. A building material based on calcium hydroxide, the building material comprising:
    a first component of lime, and the lime being a hydrated lime;
    a filler of organic origin which contains either particles or fibers of vegetable origin and is mixed with the first component to produce a structural mass which is completed with a defined volume of water, and that volume of water being calculated as a function of a mass of the structural mass to produce a paste that can be worked and that is capable of hardening, a proportion of the filler, which are in a form of either particles or fibers of hemp shavings, is between 20% and 200% of a weight of the first component; and
    an additive consisting of at least one powder based on natural materials of volcanic origin.

8. The building material based on calcium hydroxide according to claim 7, wherein the powder based on natural materials of volcanic origin contains at least pozzolana.

9. The building material based on calcium hydroxide according to claim 7, wherein the powder based on natural materials of volcanic origin is finely crushed and comprises particles of between 10 µm and 500 µm.

10. The building material based on calcium hydroxide according to claim 7, wherein a proportion of the powder based on natural materials of volcanic origin is between 5% and 25% of a weight of the first component.

11. The building material based on calcium hydroxide according to claim 7, wherein the particles or fibers of vegetable origin are selected from the group consisting of hemp, kenaf, coconut and reeds.

12. A process of preparing a building material based on calcium hydroxide, the process comprising:
    dry mixing a first component and a filler, the first component being hydrated lime and the filler being of organic origin to produce a structural mass, and including a proportion of the filler, in the form of hemp shavings, of between 20% and 200% of a weight of the first component;
    adding a defined volume of water to the structural mass to produce a paste that can be worked and is capable of hardening, and the defined volume of water being calculated as a function of a volume of the structural mass; and
    adding an additive, comprising natural materials of volcanic origin which have been crushed into a powder, to either the structural mass or the paste.

13. The process according to claim 12, further comprising crushing the natural materials of volcanic origin to a powder consisting of particles between approximately 10 µm and 50 µm in size.

14. The process according to claim 12, further comprising mixing the first component and the filler in a proportion of the filler being 50%-80% of the weight of the first component, and the filler being hemp shavings.

15. The process according to claim 12, further comprising adding the additive such that a proportion of the additive is 10%-20% of a weight of the first component, and the natural materials of volcanic origin comprises at least pozzolana.

16. The process according to claim 14, further comprising adding the additive such that a proportion of the additive is 10%-20% of the weight of the first component, and the natural materials of volcanic origin comprise at least pozzolana; and
    crushing the natural materials of volcanic origin to a powder comprising particles approximately between 10 µm and 50 µm in size.

* * * * *